(12) United States Patent
Gothoskar et al.

(10) Patent No.: US 8,363,995 B2
(45) Date of Patent: Jan. 29, 2013

(54) SUB-MICRON PLANAR LIGHTWAVE DEVICES FORMED ON AN SOI OPTICAL PLATFORM

(76) Inventors: Prakash Gothoskar, Allentown, PA (US); Margaret Ghiron, Allentown, PA (US); Robert Keith Montgomery, Easton, PA (US); Vipulkumar Patel, Monmouth Junction, NJ (US); Kalpendu Shastri, Orefield, PA (US); Soham Pathak, Allentown, PA (US); Katherine A. Yanushefski, Zionsville, PA (US)

( * ) Notice: Subject to any disclaimer, the term of this patent is extended or adjusted under 35 U.S.C. 154(b) by 0 days.

(21) Appl. No.: 13/042,989

(22) Filed: Mar. 8, 2011

(65) Prior Publication Data
US 2011/0216997 A1 Sep. 8, 2011

Related U.S. Application Data

(62) Division of application No. 10/830,571, filed on Apr. 23, 2004, now Pat. No. 7,929,814.

(60) Provisional application No. 60/464,938, filed on Apr. 23, 2003.

(51) Int. Cl.
*G02B 6/10* (2006.01)
*G02B 6/36* (2006.01)

(52) U.S. Cl. .......... 385/131; 385/31; 385/129; 438/164; 438/406; 438/479; 257/347

(58) Field of Classification Search .................... 385/30, 385/31, 39, 43, 50, 51, 129–132; 438/164, 438/406, 479; 257/347
See application file for complete search history.

(56) References Cited

U.S. PATENT DOCUMENTS

| | | | | |
|---|---|---|---|---|
| 5,838,870 A | * | 11/1998 | Soref | 385/131 |
| 6,493,497 B1 | * | 12/2002 | Ramdani et al. | 385/131 |
| 6,845,198 B2 | * | 1/2005 | Montgomery et al. | 385/50 |
| 2004/0240822 A1 | * | 12/2004 | Patel et al. | 385/130 |

* cited by examiner

*Primary Examiner* — Brian Healy
*Assistant Examiner* — Mary El Shammaa

(57) ABSTRACT

A set of planar, two-dimensional optical devices is able to be created in a sub-micron surface layer of an SOI structure, or within a sub-micron thick combination of an SOI surface layer and an overlying polysilicon layer. Conventional masking/etching techniques may be used to form a variety of passive and optical devices in this SOI platform. Various regions of the devices may be doped to form the active device structures. Additionally, the polysilicon layer may be separately patterned to provide a region of effective mode index change for a propagating optical signal.

45 Claims, 12 Drawing Sheets

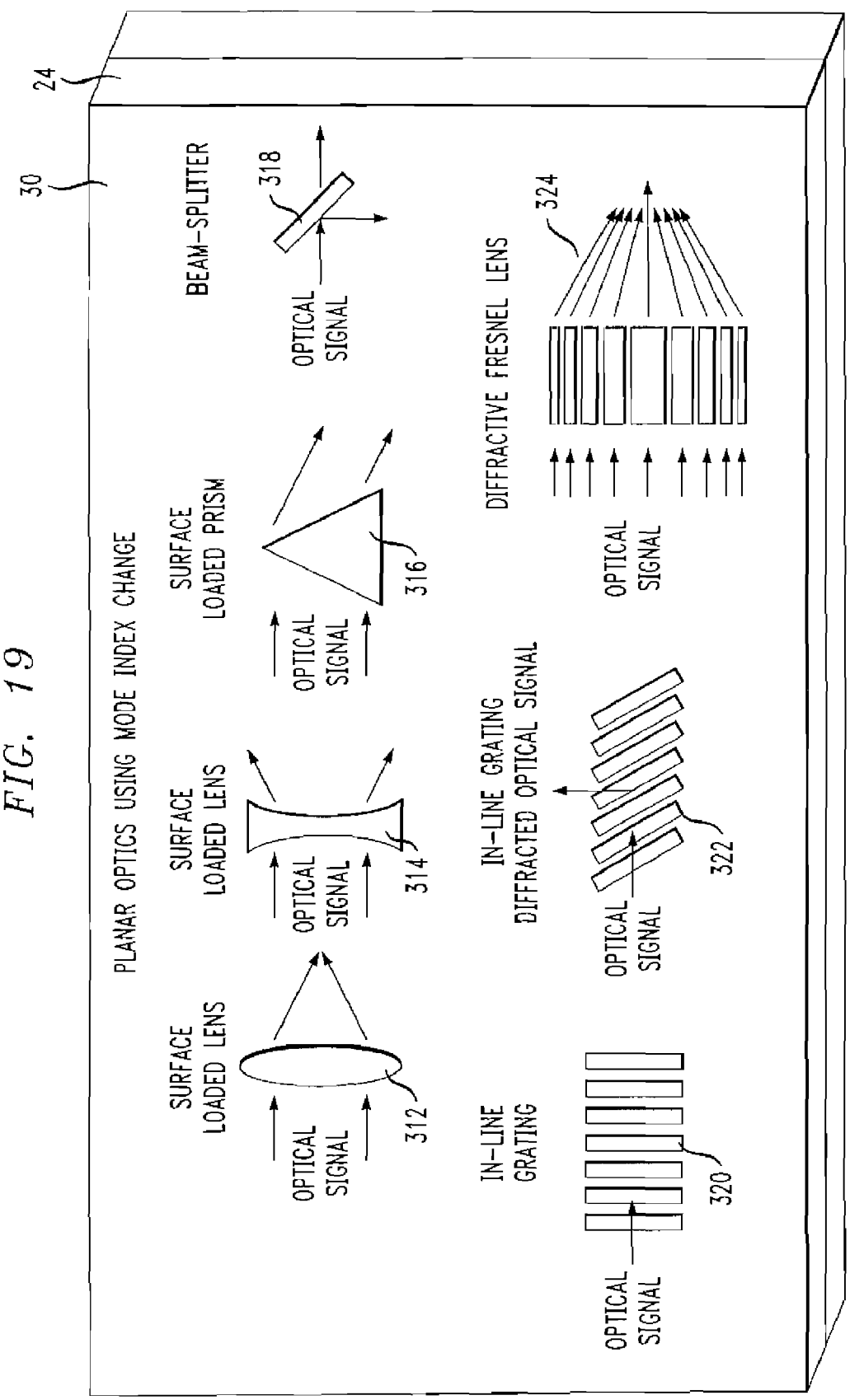

SUB-MICRON PLANAR LIGHTWAVE DEVICES FORMED ON AN SOI OPTICAL PLATFORM

CROSS REFERENCE TO RELATED APPLICATION

This application is a divisional of U.S. application Ser. No. 10/830,571, filed Apr. 23, 2004 now U.S. Pat. No. 7,929,814, which claims the benefit of U.S. Provisional Application No. 60/464,938, filed Apr. 23, 2003.

TECHNICAL FIELD

The present invention relates to the formation of planar optical waveguiding devices and, more particularly, to the formation of both passive and active planar optical devices in a sub-micron surface area of a silicon-on-insulator (SOI) platform.

BACKGROUND OF THE INVENTION

A planar lightwave circuit (PLC) is the optical equivalent of an electronic chip, manipulating and processing light signals rather than electronic signals. In most cases, a PLC is formed in a relatively thin layer of glass, polymer or semiconductor deposited on a semiconductor substrate. The lightwave circuit itself is composed of one or more optical devices interconnected by optical waveguides, the waveguides functioning to guide the light from one optical device to another and therefore considered as the optical equivalent of the metal interconnections in an electronic chip. The optical devices may comprise either passive optical devices, or active electro-optic devices, performing functions including, for example, reflection, focusing, collimating, beam splitting, wavelength multiplexing/demultiplexing, switching modulation and detection, and the like.

The common platforms used for the integration of lightwave devices are based upon using InP, silica-on-silicon, polymer and silicon oxynitride. The ability to integrate electronic components with these optical devices has always been extremely limited, since the majority electronic integrated circuit technology is based upon a silicon platform, rather than any of the above-mentioned platforms used for lightwave devices. A true integration of optics and electronics could be achieved, therefore, through the formation of optical devices in a silicon platform. A candidate system for such an integration is the silicon-on-insulator (SOI) structure, which allows for the guiding of light in the same surface single crystal silicon layer (hereinafter referred to as the "SOI layer") that is used to form electronic components.

As of now, the common planar optical devices formed in an SOI structure use a relatively thick (>3-4 μm) SOI layer, so as to allow for relative ease of input/output coupling of a lightwave signal to the SOI layer through methods such as edge illumination. However, the need for edge-illumination coupling requires access to the edge of the chip, as well as the formation of an edge with a high surface quality. Further, the fabrication of high definition structures is considered to be rather difficult in a thick SOI layer (for example, forming "smooth" vertical walls for waveguides, rings, mirrors, etc). The thickness of the silicon also prevents the use of conventional CMOS fabrication processes to simultaneously form both the electronic and optical components. Moreover, the thickness of the SOI layer also limits the speed of the electronic devices.

Once the thickness of the SOI layer drops below one micron (which would be preferable to address the above-described problems), a significant challenge remains in terms of coupling a sufficient amount of a lightwave signal into and out of such a relatively thin layer. Several methods being explored for use in coupling light into a thin SOI layer include waveguide gratings, inverse nano-tapers and three-dimensional horn tapers. However, the coupled light propagates in the SOI layer with only vertical confinement (slab waveguide). The propagation of light in the lateral direction is similar to that in free space, with the refractive index of the medium equal that of silicon. In order to make a practical use of the coupled light, the need remains to effectively manipulate the light in the sub-micron SOI layer. More particularly, the need exists to perform various optical functions, such as turning, focusing, modulating, attenuating, switching and selectively dispersing the light coupled in the silicon layer. For a true integration of optics and electronics, all of these optical functions need to be achieved without exiting the planar waveguide structure.

SUMMARY OF THE INVENTION

The need remaining in the prior art is addressed by the present invention, which relates to the formation of planar optical waveguiding devices and, more particularly, to the formation of both passive and active planar optical devices in a sub-micron surface area of a silicon-on-insulator (SOI) platform.

In accordance with the present invention, a relatively thin (i.e., sub-micron) single crystal silicon surface layer (hereinafter referred to as the "SOI layer") of an SOI structure is used to form any of a variety of planar optical devices (e.g., waveguides, tapers, mirrors, gratings, lenses, lateral evanescent couplers, waveguide couplers, splitters/combiners, ring resonators, dispersion compensators, arrayed waveguide gratings (AWGs), and the like).

It is an advantage of the present invention that the use of a sub-micron thick SOI layer to form optical devices allows for use of conventional CMOS techniques for processing both the optical and electronic devices. For example, techniques such as local oxidation or multi-layer deposition and etching/oxidation can be used to optimize the optical characteristics of a waveguide structure. The state-of-the-art lithographic techniques can be used to define optical structures with a high degree of precision (e.g., ~0.005 μm resolution). A high resolution etching can be achieved through processes such as plasma etching (for example, shallow trench etching (STI), reactive ion etching (RIE) or inductively-coupled etching).

In an alternative embodiment of the present invention, a sub-micron thick silicon layer (for example, polysilicon) is formed over the sub-micron thick SOI layer and separated therefrom by a thin dielectric layer (total thickness of all three layers remaining less than one micron). The combination of layers may be processed using conventional CMOS techniques to form a variety of devices. Since both the silicon layer and the SOI layer can be doped, active optical device structures (such as modulators, switches, wavelength-selective ring resonators, etc.) can be formed in addition to passive optical components.

By virtue of the ability to couple light into a sub-micron silicon waveguide as disclosed in commonly-assigned U.S. Pat. No. 7,020,364, sub-micron SOI layers and silicon layers can advantageously be processed to form any type of planar optical component. That is, there is no longer a need to use a relatively thick surface waveguiding silicon layer to facilitate the coupling of light.

In yet another embodiment of the present invention, the silicon layer can be etched to form various two-dimensional shapes (lenses, prisms gratings, etc.), where the mode index change as an optical signal passes through the shaped region provides the desired manipulation of the optical signal. The thickness difference between the SOI layer and the silicon layer results in a change in the effective index of the waveguide, which can be used to modify the behavior of the lightwave signal propagating in the SOI layer. In particular, different shapes, such as lenses, prisms, tapers and gratings can be formed by etching the silicon layer to accomplish different optical functions. Indeed, it is also possible to utilize a semiconductor material other than silicon for this layer, such as silicon dioxide, silicon nitride, or a material such as erbium-doped glass, where conventional etching processes are then used to form two-dimensional optical devices in these other materials (which exhibit different refractive indices).

Other and further advantages of the present invention will become apparent during the course of the following discussion and by reference to the accompanying drawings.

BRIEF DESCRIPTION OF THE DRAWINGS

Referring now to the drawings,

FIG. 19 is an isometric view of a number of different sub-micron thick polysilicon devices that may be formed over an SOI layer to introducing various effective mode index changes to a propagating lightwave signal.

DETAILED DESCRIPTION

Figure 1:
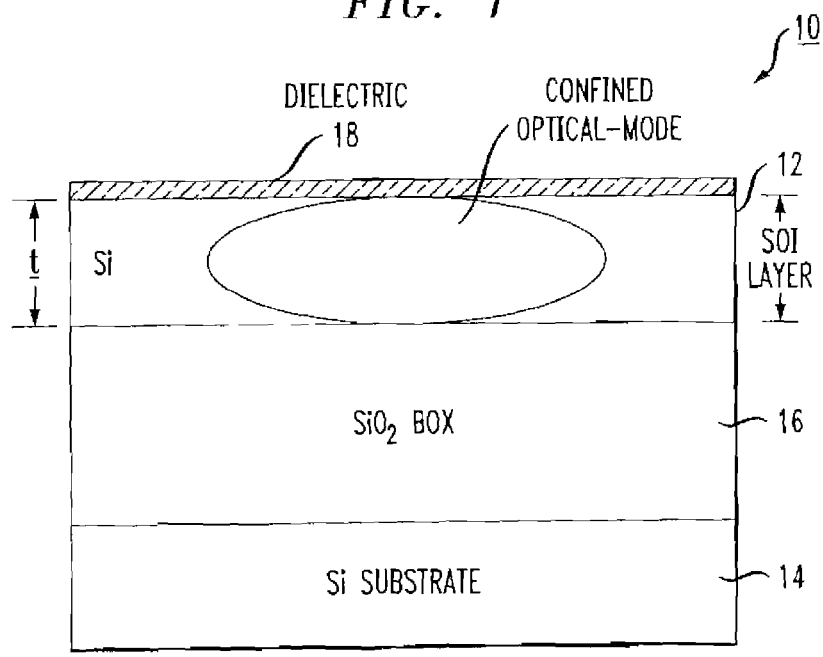
FIG. 1 is a cross-sectional view of an exemplary SOI structure, particularly illustrating the confinement of an optical mode in a sub-micron silicon surface layer ("SOI layer") of the SOI structure.

FIG. 1 illustrates an exemplary SOI structure 10 showing the confinement of an optical signal within an upper silicon surface layer 12 (hereinafter referred to as the "SOI" layer) of SOI structure 10, where SOI layer 12 is shown as comprising a thickness t of less than one micron. An arrangement for coupling light into sub-micron SOI layer 12 through its top surface is disclosed in our above-referenced U.S. Pat. No. 7,020,364. Referring back to FIG. 1, SOI structure 10 includes a silicon substrate 14 and a dielectric layer 16 (usually comprising silicon dioxide) formed over substrate 14. SOI layer 12 is then formed over dielectric layer 16, where layer 16 is often referred to in the art as a "buried dielectric" (e.g., a "buried oxide", referred to as a BOX) layer. A relatively thin dielectric layer 18 is then formed over SOI layer 12.

Figure 2:
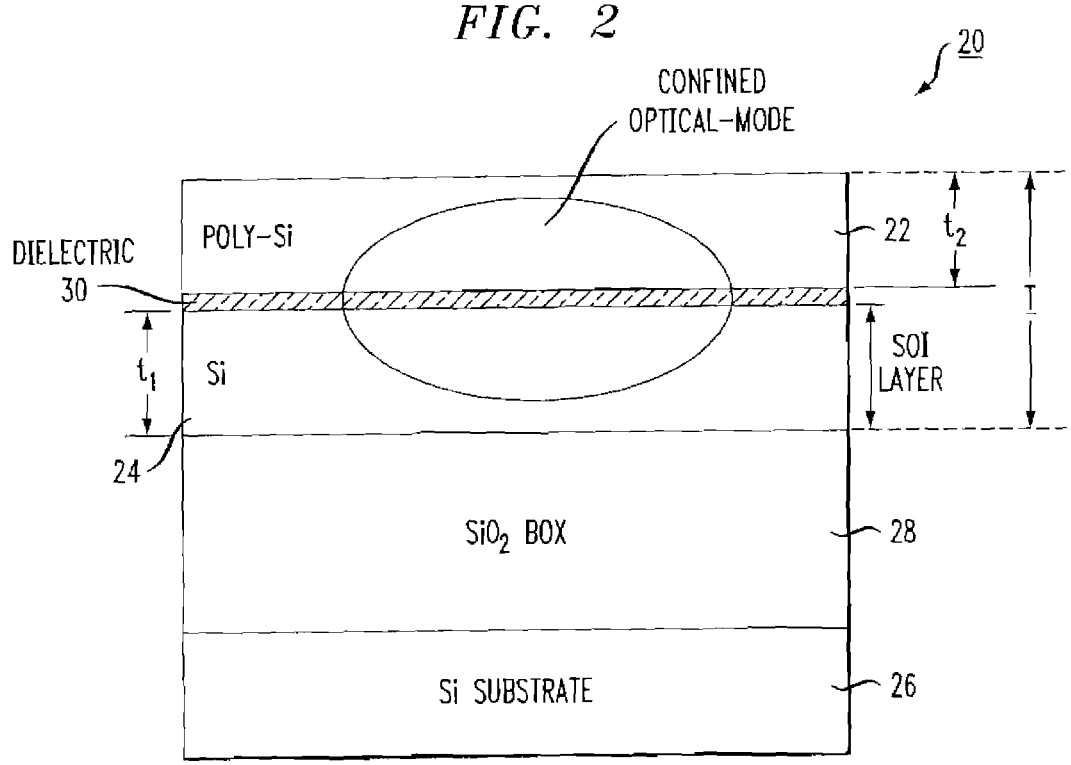
FIG. 2 is a cross-sectional view of an alternative, exemplary SOI structure including a device silicon layer, in this case polysilicon, formed over the SOI layer, where both the polysilicon layer and the SOI layer comprise a sub-micron thickness, the illustration of FIG. 2 also showing the support of an optically confined mode within the combination of the polysilicon layer and the SOI layer (with a thin dielectric layer disposed between the polysilicon layer and the SOI layer)

An alternative SOI structure 20 is illustrated in FIG. 2, which shows the use of a polysilicon layer 22 in combination with an SOI layer 24 to support a propagating optical signal. As with the embodiment of FIG. 1, SOI structure 20 includes a silicon substrate 26 and a dielectric layer 28 disposed over substrate 26. A relatively thin dielectric layer 30 may be disposed between SOI layer 24 and polysilicon layer 22, but is not required for some embodiments. In accordance with this particular embodiment. the total thickness T of both SOI layer 24 and polysilicon layer 22, with or without the presence of dielectric layer 30, remains less than one micron. The individual thicknesses of SOI layer 24 and polysilicon layer 22, denoted $t_1$ and $t_2$, respectively, may be controlled in accordance with the fabrication process of the present invention to dictate the vertical position (i.e., optical mode) of an optical signal. For example, when $t_1=t_2$, approximately 50% of the signal intensity will reside in each layer.

Figure 3:
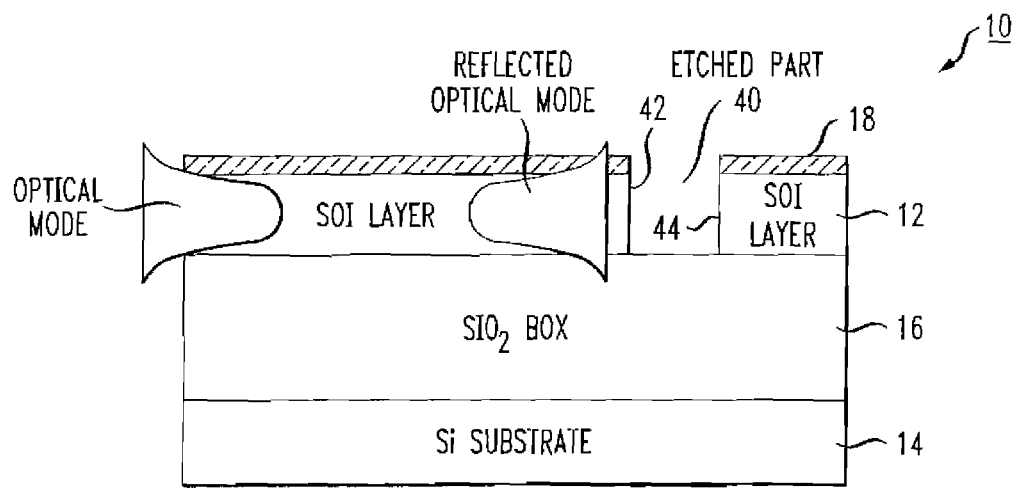
FIG. 3 illustrates the formation of a reflective vertical surface within the SOI structure of FIG. 1.
Figure 5:
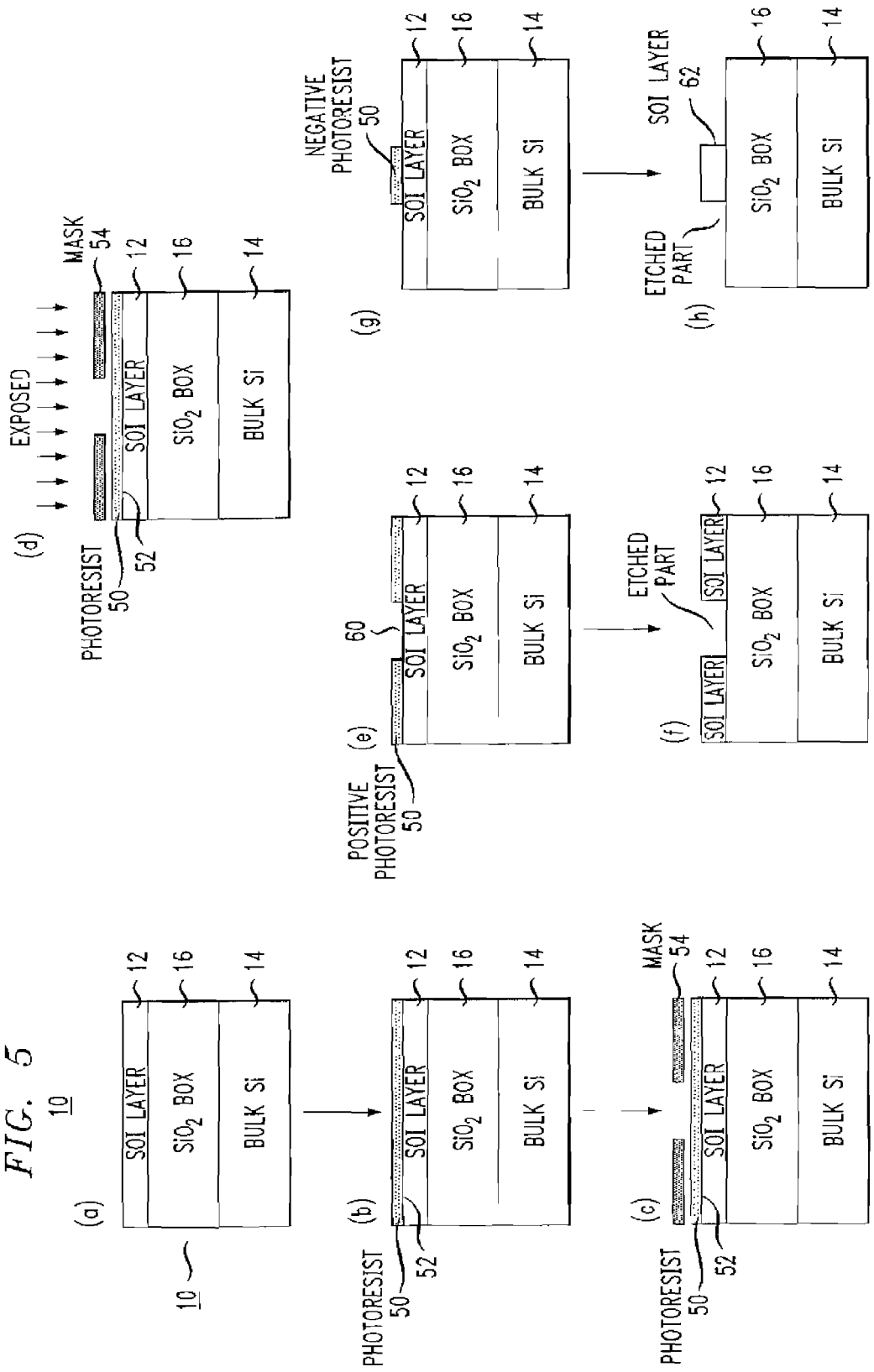
FIGS. 5(a)-(h) illustrate an exemplary of processing steps that may be used form planar, two-dimensional optical devices in a sub-micron SOI layer.

FIG. 3 illustrates the formation of a vertical reflective surface within SOI structure 10 of FIG. 1 in accordance with the present invention. In particular, SOI layer 12 is etched (using, for example, the process sequence discussed hereinbelow in association with FIG. 5) to form an "optically smooth" surface 42 within an etched region 40 of SOI layer 12. By virtue of the etch process, opposing sidewall 44 is also optically smooth. Referring to FIG. 3, the optical signal is illustrated as propagating from left to right along SOI layer 12. When vertical surface 42 is encountered, the signal is completely reflected (that is, "total internal reflection", TIR), by virtue of the index difference between silicon and "air" (where another low index material, such as silicon dioxide or silicon nitride, may alternatively be disposed within etched region 40 to simplify later processing steps by planarizing the structure).

Figure 4:
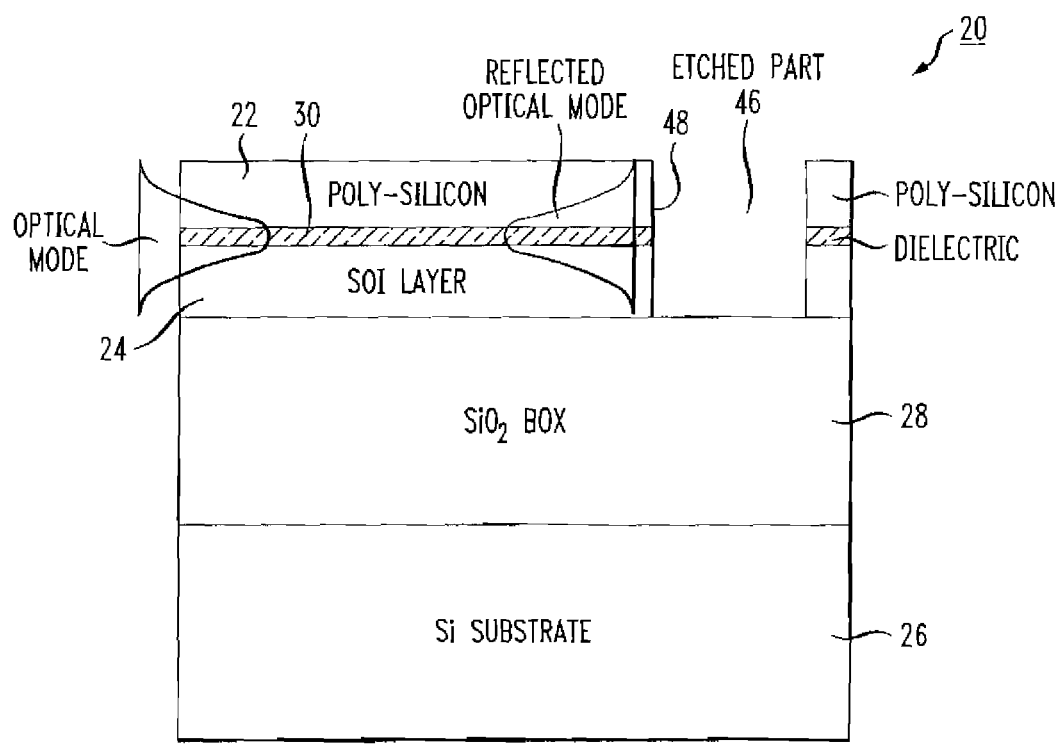
FIG. 4 illustrates the formation of a reflective vertical surface within the polysilicon/SOI structure of FIG. 2.

FIG. 4 illustrates the formation of a reflective surface in structure 20 of FIG. 2, where thin dielectric layer 30 and silicon layer 22 are formed over SOI layer 24. An etched region 46 is formed in structure 20, including a vertical sidewall 48, where vertical sidewall 48 provides for the reflection of the propagating optical signal. In this embodiment using both an SOI layer and an "optical silicon" layer, the optical mode is shifted, in comparison to the arrangement of FIG. 3, such that some of the optical energy propagates along both layers 22 and 24. As mentioned above, the relative thicknesses of SOI layer 24 and optical silicon layer 22 will dictate the actual placement of the propagating optical mode within this structure.

While FIGS. 3 and 4 illustrate the formation of a reflective vertical sidewall in a cut-away side view, it is to be understood that the actual geometry of the etched region may be of any desired shape, controlled only by the pattern in the mask and the processing steps used to create the opening(s) in SOI layer 12, or in the combination of SOI layer 24 and optical silicon layer 22. An exemplary fabrication process that may be used to pattern and form two-dimensional, planar optical devices in an SOI layer is illustrated in FIGS. 5(a)-(f). For the purposes of discussion, the illustrated process is associated with forming devices directly in an SOI layer. It is to be understood that a similar set of process steps may be used to etch through the combination of an SOI layer, dielectric layer and optical silicon layer to form the same selection of planar optical devices.

Referring to FIG. 5(a), the process begins with the structure 10 as illustrated in FIG. 1, comprising silicon substrate 14, buried dielectric layer 16 and sub-micron SOI layer 12. A layer of photoresist 50 is then applied across top surface 52 of sub-micron SOI layer 12, as shown in FIG. 5(b). A mask 54 is then positioned over photoresist 50, where as discussed above mask 54 is configured to properly outline each of the two-dimensional structures that is desired to be etched into sub-micron SOI layer 12. FIG. 5(c) illustrates the placement of mask 54 over photoresist layer 50 on SOI structure 10. Once mask 54 is in place, the arrangement is exposed to a particular type of light, as shown in FIG. 5(d), to expose the uncovered regions of photoresist layer 50. For example, ultraviolet light passing through mask 54 will transfer the pattern of mask 54 to the light-sensitive photoresist layer 50. The photoresist is then developed, using a conventional process, and the image transferred to the underlying sub-micron SOI layer 12.

Photoresist layer 50 may comprise either a "positive" photoresist material or a "negative" photoresist material. When using a positive photoresist material, the exposure process shown in FIG. 5(d) will result in removing any of the underlying silicon material that is exposed by the pattern formed in mask 54. FIG. 5(e) illustrates the result of using a positive photoresist, with the removal of region 60 within photoresist layer 50. With this patterning of photoresist layer 50, an etching process is then used to remove the exposed portion(s) of sub-micron SOI layer 12, as shown in FIG. 5(f). In particular, a dry etch (i.e., plasma) process is preferred to a "wet" (chemical) etching process, since sub-micron geometries are involved in forming the final device features and only a dry etch process is considered to provide this level of resolution. A conventional wet chemical etch is better suited to the formation of conventional, larger (one micron and above) electronic components. When a negative photoresist material is used for photoresist layer 50, the exposure process of FIG. 5(d) results in forming the structure as illustrated in FIG. 5(g), where only the "exposed" portion of photoresist layer 50 remains. A subsequent etch of this structure, as shown in FIG. 5(h), may result in forming a sub-micron "rib" waveguide 62 within SOI layer 12. Further process steps, in terms of local oxidation and/or annealing may be used to "smooth" the sidewalls of the features formed by etching.

With this understanding that the two-dimensional shape of the cavity region(s) formed in SOI layer 12 (or the combination of SOI layer 24 and optical silicon layer 22) is controlled by the pattern within the mask used to etch layer 12, a number of different planar optical devices (both passive and active) that may be formed within this sub-micron structure are described below and illustrated in the accompanying figures. It is to be understood, however, that these various devices are considered exemplary only; indeed, any desired planar optical device, or combination of planar optical devices may be formed in a sub-micron SOI structure in accordance with the teachings of the present invention. Moreover, a number of these devices will be discussed as formed by etching specific patterns/regions in SOI layer 12. It should be noted that the same structures may be formed within the sub-micron thick combination of SOI layer 24, dielectric layer 30 and optical silicon layer 22, where the need for the additional optical silicon layer for some features may dictate when this latter structure is to be employed.

Figure 6:
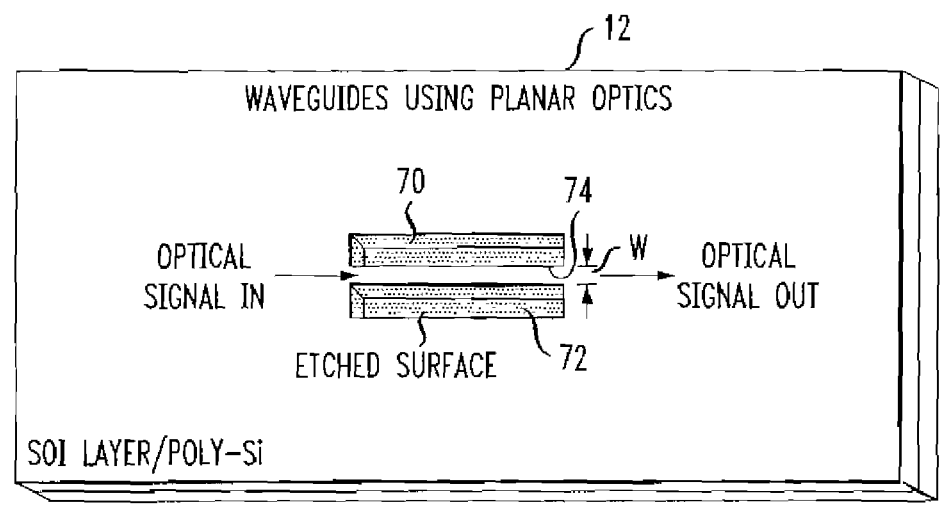
FIG. 6 is an isometric view of an exemplary waveguide structure formed in a sub-micron SOI layer in accordance with the present invention.

FIG. 6 contains an isometric view of an exemplary waveguide structure formed within sub-micron SOI layer 12. In this case, a planar, two-dimensional waveguide is formed by etching a pair of parallel, rectangular openings 70 and 72 through the entire thickness of sub-micron SOI layer 12 (thus exposing the underlying buried dielectric layer 16). By virtue of the lateral confinement provided by the refractive index difference between silicon and "air", a lightwave signal propagating along SOI layer 12 from the left, as shown in FIG. 6, will be confined and guided within waveguide 74 created between etched openings 70 and 72. Even though etching openings 70 and 72 are illustrated as linear, it is to be understood that any other geometry is appropriate, as long as guiding is maintained. Indeed, the high resolution possible with known etching techniques allows for the formation of a waveguide region 74 with an extremely small cross-section—sub-micron in height (as defined by the thickness of SOI layer 12) and a sub-micron width w, dictated by the mask features.

Figure 7:
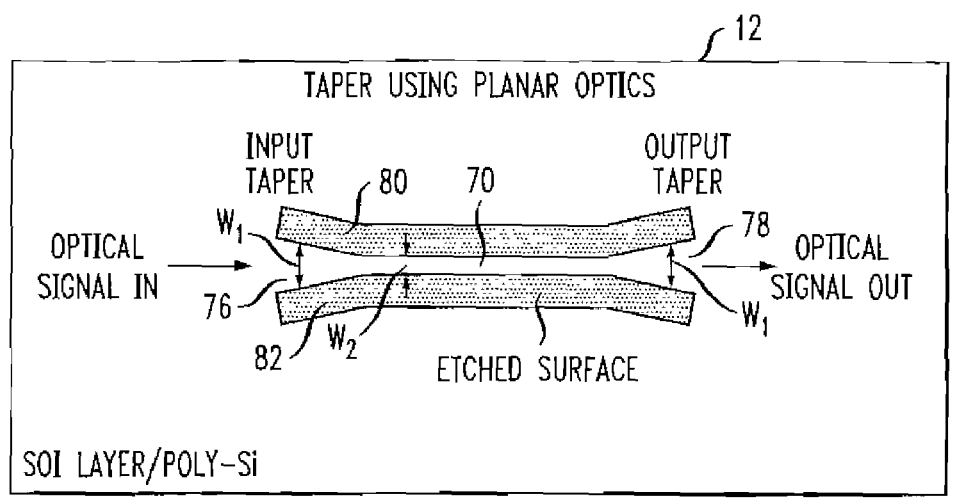
FIG. 7 is a top view of an exemplary tapered waveguide structure formed in a sub-micron SOI layer in accordance with the present invention.

FIG. 7 contains a variant of the arrangement illustrated in FIG. 6, in this case illustrating the formation of an input taper 76 and output taper 78 for use in association with waveguide 70. In order to form these tapers, a different etch mask is used to form etched openings 80 and 82 with the geometry as shown in FIG. 7. That is, at the input to waveguide 70, the etch pattern is controlled to increase the space between the etched openings 80 and 82. Since the space between openings 80 and 82 is increased, the width of the waveguide formed therebetween is similarly expanded, illustrated in FIG. 7 as having a width of $w_1$ (the width of waveguide 70 then being defined as $w_2$). A similar spacing is included at the output side of the waveguide, with openings 80 and 82 separating to form an output waveguide region with a width of $w_2$. In some cases, there may be a need to utilize adiabatic tapers, where the taper size required for this feature is easily defined in a mask and subsequently used to etch the desired adiabatic shape.

Figure 8:
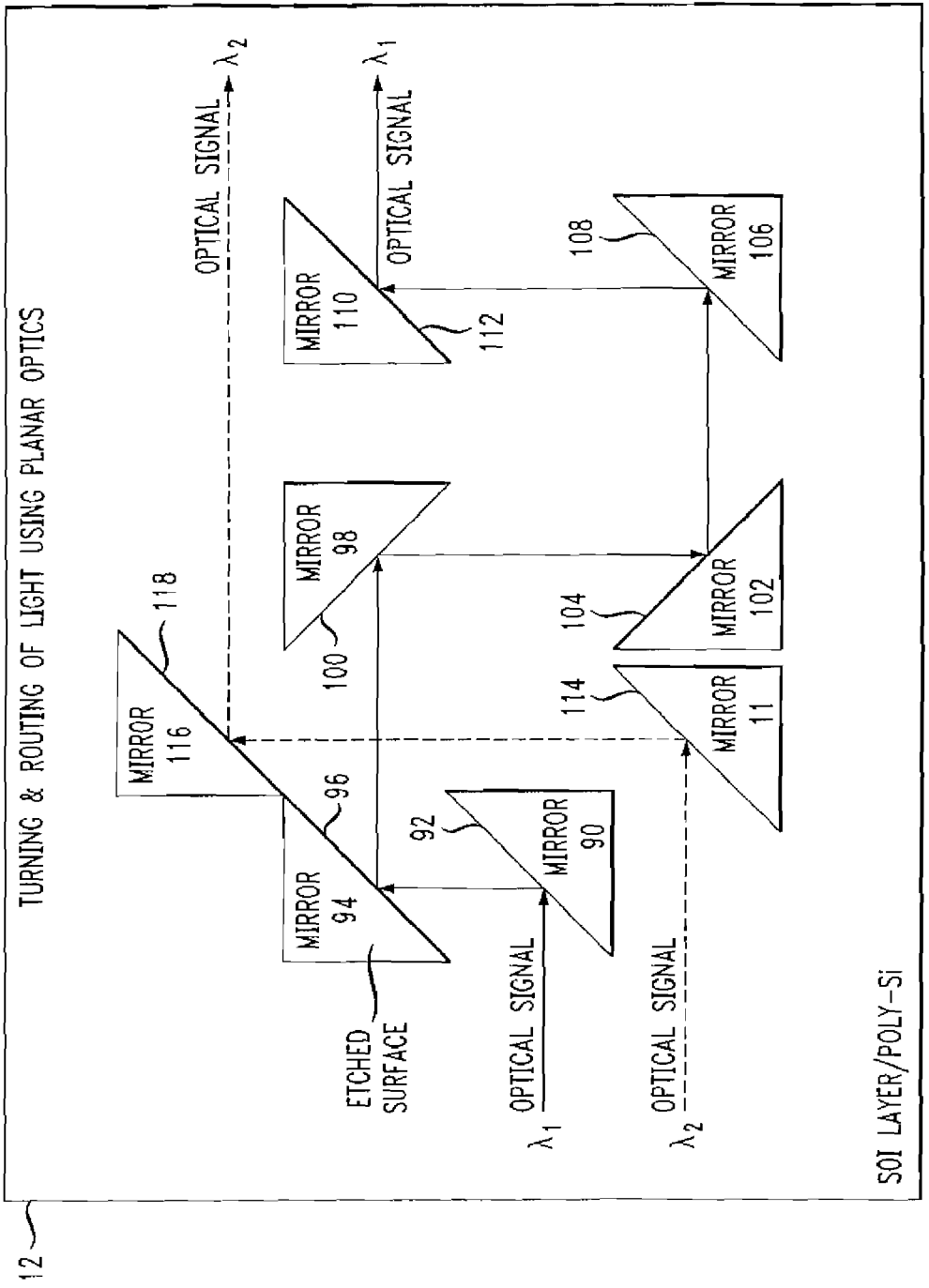
FIG. 8 is a top view of an exemplary turning and rounding arrangement, comprising a plurality of mirror regions etched in a sub-micron SOI layer in accordance with the present invention.

FIG. 8 contains a top view of an exemplary arrangement for providing turning and routing of optical signals within SOI layer 12, where each mirror comprises a triangular wedge shape that is etched into SOI layer 12. The various etched openings are disposed at separate, pre-defined locations across the surface of SOI layer 12, so as to provide the desired turning and/or routing functions. In the particular embodiment as shown in FIG. 8, a first lightwave signal, propagating at a wavelength $\lambda_1$ first encounters an etched mirror region 90, where this lightwave signal will be reflected 90° by the 45° vertical wall 92 of region 90. The reflected signal next encounters etched mirror region 94, reflects off of etched surface 96 and propagates along until encountering etched mirror region 98. The lightwave signal then reflects off of vertical wall 100 of etched mirror region 98 and propagates toward etched mirror region 102. The signal then reflects off of vertical wall 104, encounters etched mirror region 106, reflects off of vertical wall 108 and is directed toward a final etched mirror region 110. The signal then reflects off of vertical wall 112 of mirror 110 and exits the device. A second lightwave signal (here illustrated as operating at a different wavelength $\lambda_2$, but the same wavelength may be used) is provided as an input to an etched mirror region 114, and is redirected by reflective vertical wall 116 toward a second etched mirror region 118. The lightwave signal is then reflected off of vertical wall 120 of etched mirror region 118 and exits the device.

Figure 9:
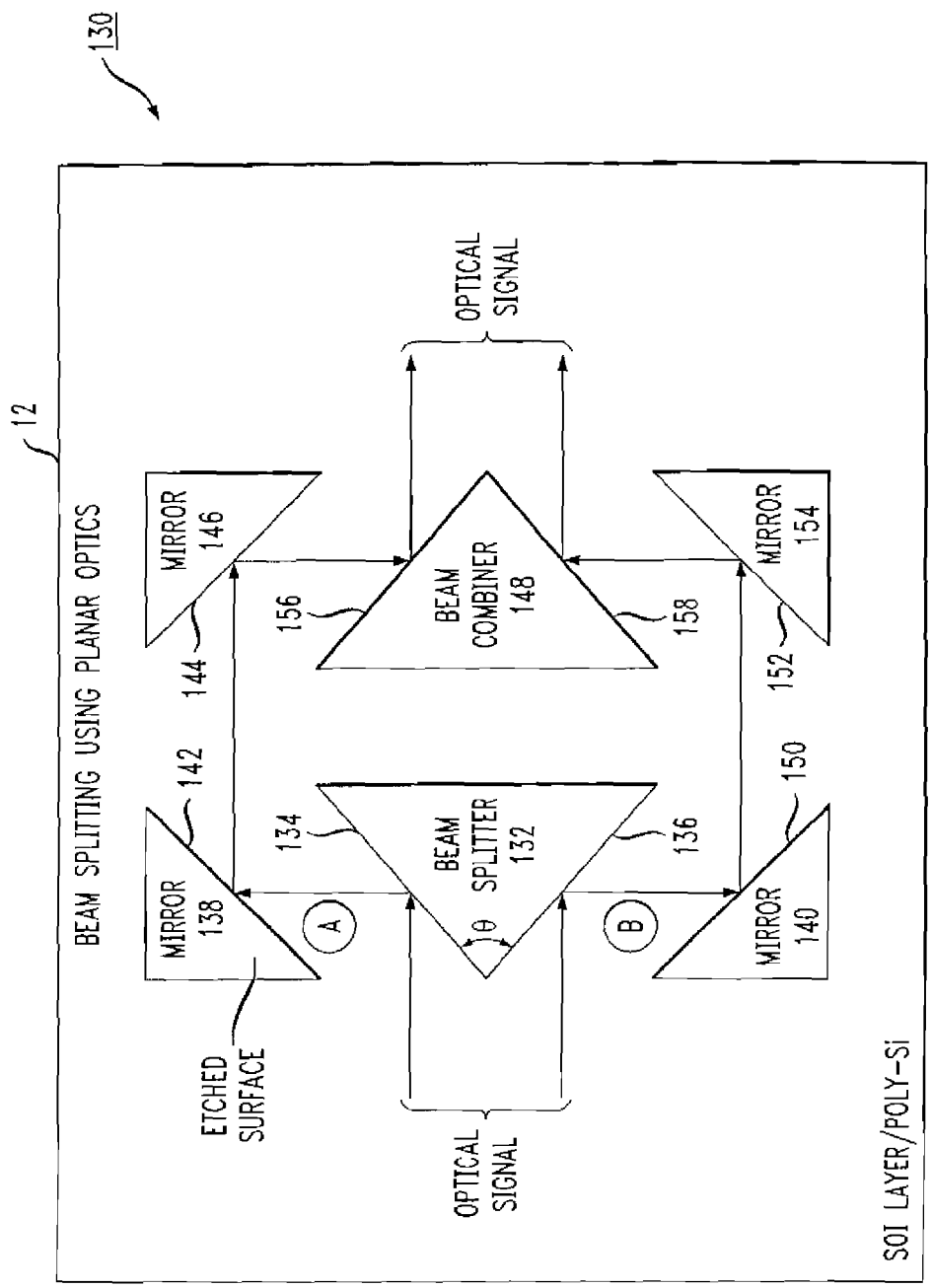
FIG. 9 is a top view of an exemplary beam splitter formed in a sub-micron SOI layer in accordance with the present invention.

A beam splitting arrangement 130 formed from planar optical devices of the present invention is illustrated in FIG. 9, where for the sake of illustration beam splitting arrangement 130 is considered as formed within SOI layer 12. As mentioned above, it is to be understood that arrangement 130, and any other arrangement discussed herein, may also be formed within the "stacked" combination of SOI layer 24, dielectric layer 30 and optical silicon layer 22. Referring to FIG. 9, beam splitting arrangement 130 includes a first etched triangular region 132, region 132 including a first reflective surface 134 and a second reflective surface 136. The angle θ between surfaces 134 and 136 is controlled by the definition of the mask used to form arrangement 130. An incoming lightwave signal, therefore, will encounter the V-shaped wedge defined by surfaces 134 and 136, with a first portion of the lightwave signal (designated as "A" in FIG. 9) being re-directed in the manner shown toward an etched mirror region 138. In a similar fashion, a second portion of the lightwave signal (designated as "B" in FIG. 9), is re-directed toward an etched mirror region 140. Lightwave signal portion A is reflected off of surface 142 of etched mirror region 138 and is directed toward a reflective surface 144 of an etched mirror region 146, where reflective surface 144 functions to re-direct lightwave signal portion A toward an optical beam combiner 148. In a similar fashion, lightwave signal portion B is re-directed by a reflective surface 150 of etched mirror region 140 toward a reflective surface 152 of an etched mirror region 154. Lightwave signal portion B is then re-directed by reflective surface 152 toward optical beam combiner 148. As shown in FIG. 9, optical beam combiner 148 includes a pair of reflective surfaces 156 and 158, which are presumably separated by essentially the same angle θ, so as to re-direct these two signal portions A and B, combining them into a single output lightwave signal.

Figure 10:
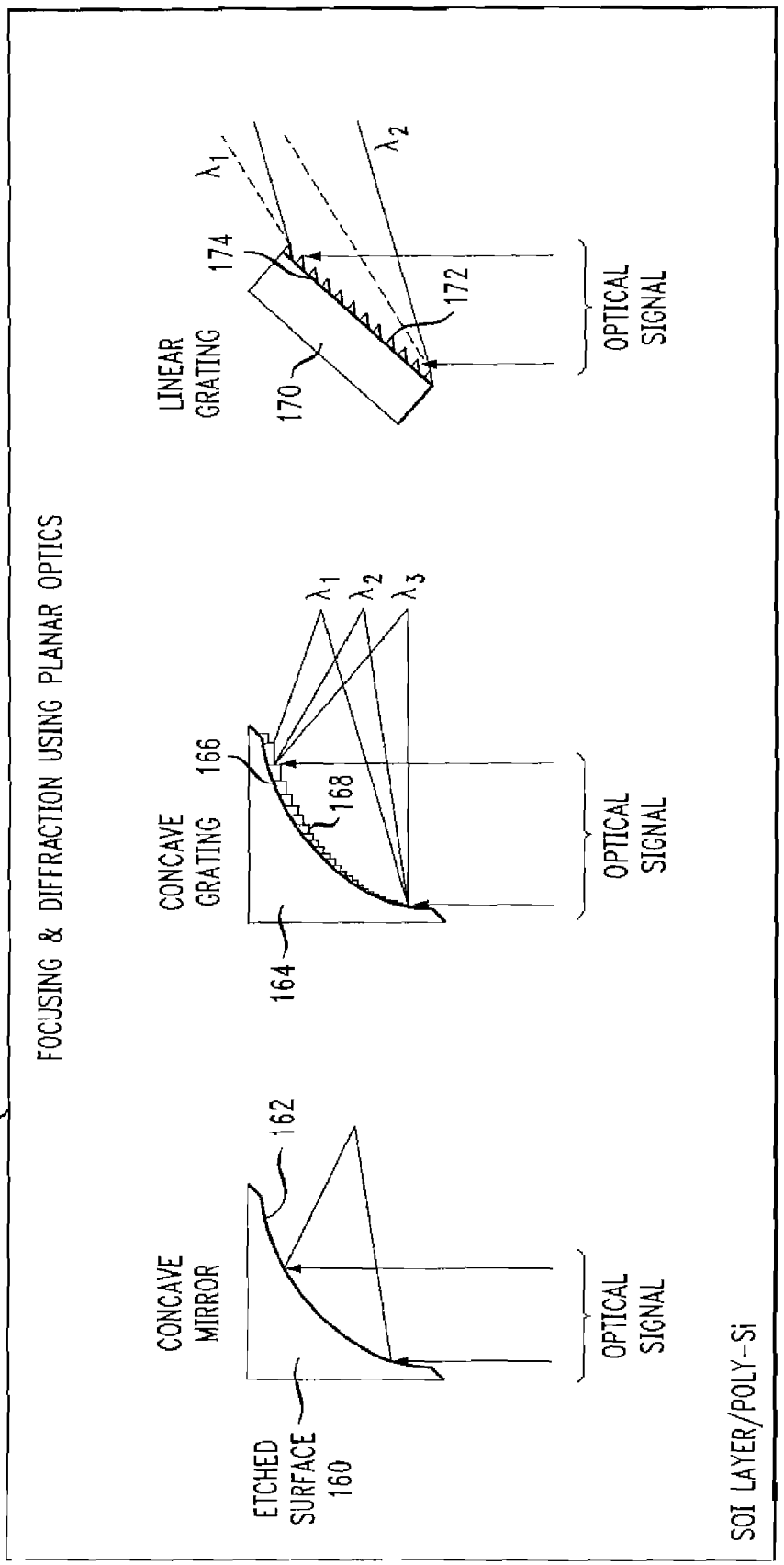
FIG. 10 is a top view of a set of focusing and diffracting two-dimensional optical devices formed in a sub-micron SOI layer in accordance with the present invention.

FIG. 10 is a top view of focusing and diffracting elements that can be formed by patterning SOI layer 12 of SOI structure 10. In particular, a concave (focusing) mirror 160 is shown as formed by an etched cavity within SOI layer 12, where the curve of etched surface 162 of mirror 160 is controlled (by properly forming the patterning mask) to be parabolic in form so as to focus the incoming light at a focal point F within SOI layer 12. In systems employing optical signals operating at more than one wavelength (such as, for example, WDM systems), a concave grating 164 may be formed to include a curved reflecting surface 166, where surface 166 is formed to have a grating structure 168 to separate each wavelength and focus each separate signal at a different point, as shown in FIG. 10. By virtue of using a lithography/etch process to form concave grating 164, the particular parameters of grating structure 168 (such as, for example, the period of the grating) can be well-controlled to provide an efficient, planar grating structure for use in WDM systems. A linear grating 170, as also shown in FIG. 10, may be formed as an etched cavity in SOI layer 12 and used to separate an incoming optical signal into its separate wavelength components. As shown, linear grating 170 is formed within SOI layer 12 so as to be positioned at a predetermine angle with respect to the incoming lightwave signal, where a grating 172 on surface 174 of linear grating 170 will function to separate out the various wavelengths.

Figure 11:
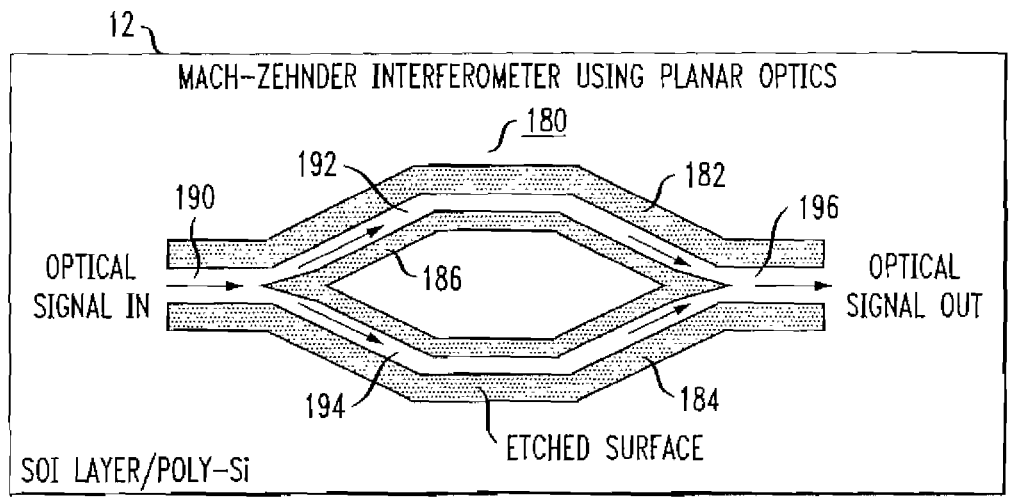
FIG. 11 is a top view of an exemplary Mach-Zehnder interferometer formed in a sub-micron SOI layer in accordance with the present invention.

In accordance with the present invention, it is to be understood that each of the planar, two-dimensional optical components desired to be formed within a common SOI layer 12 is formed simultaneously, by properly defining a single mask used to pattern the photoresist layer. For example, the complete structure as illustrated in FIG. 10 may be formed by using a single mask, a single exposure step and a single etching step. Indeed, it is to be understood that any desired two-dimensional pattern may be formed, including tapers (particularly adiabatic tapers used for mode conversion), splitters, combiners, etc. For example, FIG. 11 illustrates a Mach-Zehnder interferometer 180 formed by patterning and etching the surface of SOI layer 12, including a first etched cavity 182, a second etched cavity 184, and a third etched cavity 186, this set of etched cavities particularly patterned to form an input waveguide section 190, a first interferometer arm 192, a second interferometer arm 194, and an output waveguide section 196. While Mach-Zehnder interferometer 180 is illustrated as being "symmetric", in terms of input waveguide section 190 splitting an equal amount of optical power into arms 192 and 194, it is obvious that the masking pattern used to etch SOI layer 12 may easily be modified to form an asymmetric interferometer.

Figure 12:
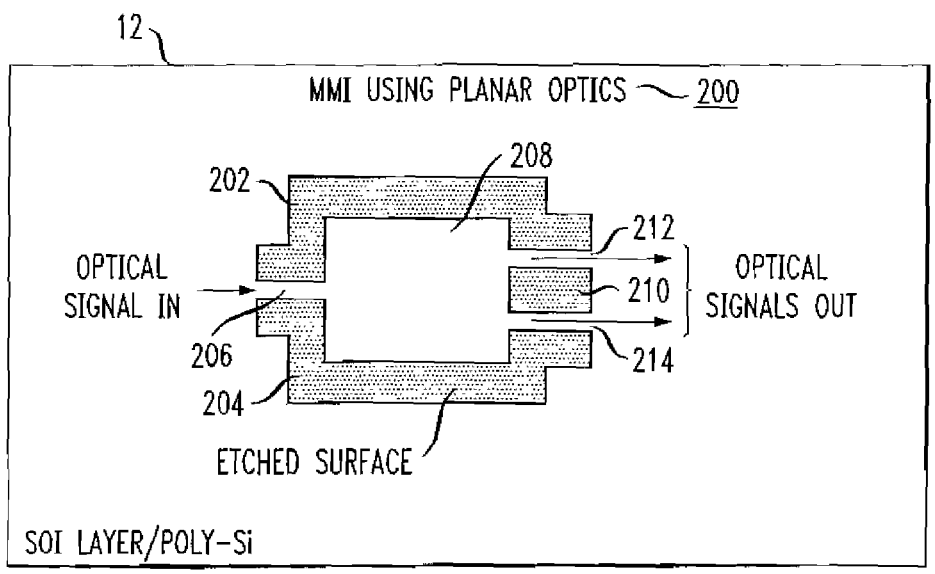
FIG. 12 is a top view of an exemplary multimode interference planar optical device formed in a sub-micron SOI layer in accordance with the present invention.

A multimode interference (MMI) splitter 200, formed by patterning and etching SOI layer 12 of SOI structure 10 is illustrated in FIG. 12. As shown, splitter 200 is formed by etching regions 202 and 204, sized and positioned as shown in FIG. 12 to form an input waveguide section 206 and a cavity region 208, cavity region 208 functioning to allow the input signal to reflect off of the various internal reflecting vertical walls formed by etched regions 202 and 204, thus forming an interference pattern determined by the dimensions of cavity region 208. A separate etched structure 210 is positioned as shown between etched regions 202 and 204 to form a pair of output waveguides 212 and 214. Alternatively, a set of etched structures may be disposed between etched regions 202 and 204, forming a plurality of N output waveguides.

Figure 13:
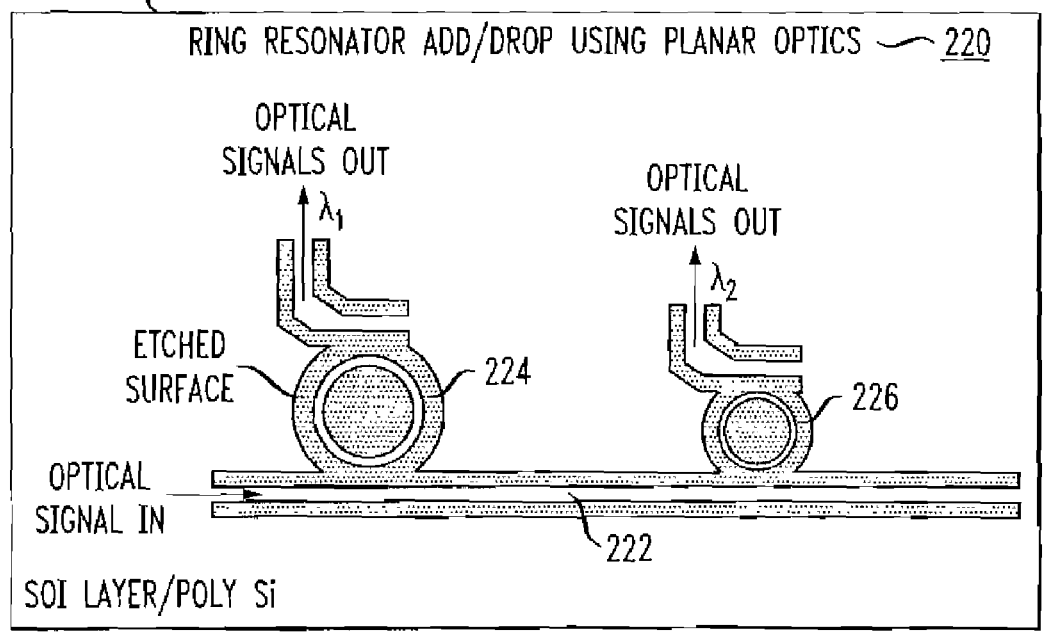
FIG. 13 is a top view of an exemplary ring resonator add/drop device formed in a sub-micron SOI layer in accordance with the present invention.
Figure 14:
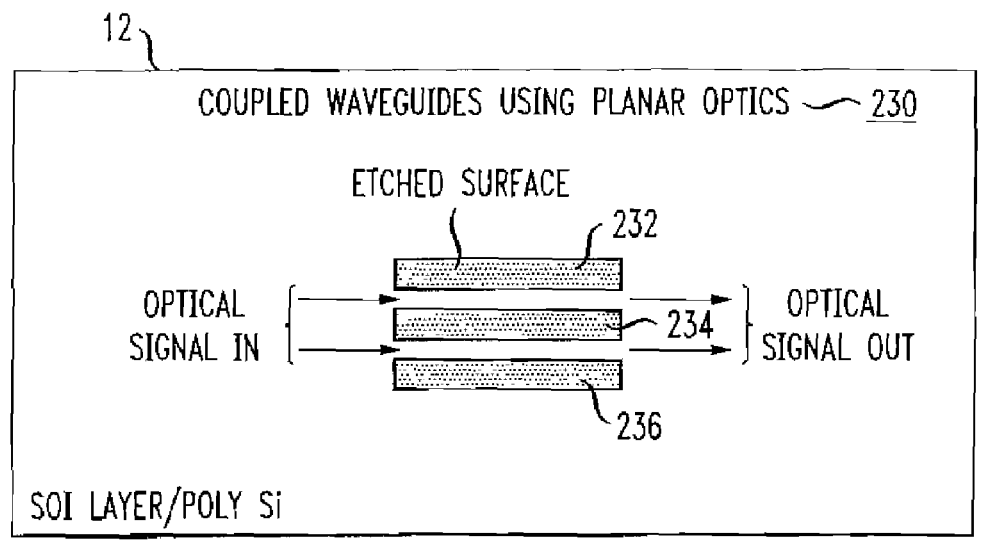
FIG. 14 is a top view of a pair of coupled optical waveguides formed within a sub-micron SOI layer in accordance with the present invention.

FIG. 13 illustrates an add/drop ring resonator 220, formed by properly etching various features within SOI layer 12. As shown, SOI layer 12 is etched to form a waveguide 222, a first ring resonator 224 sized to be sensitive to wavelength $\lambda_1$, so as to either insert a signal at that wavelength along waveguide 222, or filter out a signal propagating at that wavelength, the out-coupling arrangement being illustrated in FIG. 13. A second ring resonator 226, disposed further along waveguide 222, is sized to be sensitive to wavelength $\lambda_2$. A waveguide coupler 230 is illustrated in FIG. 14, and is formed by simply etching a set of three regions 232, 234 and 236, as shown.

Figure 15:
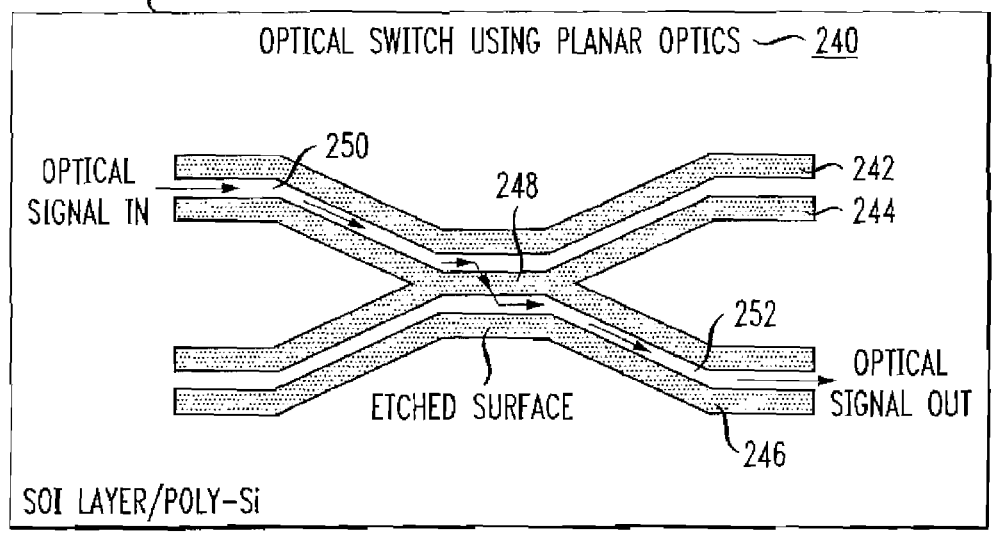
FIG. 15 is a top view of an exemplary optical switch formed within a sub-micron SOI layer in accordance with the present invention.
Figure 16:
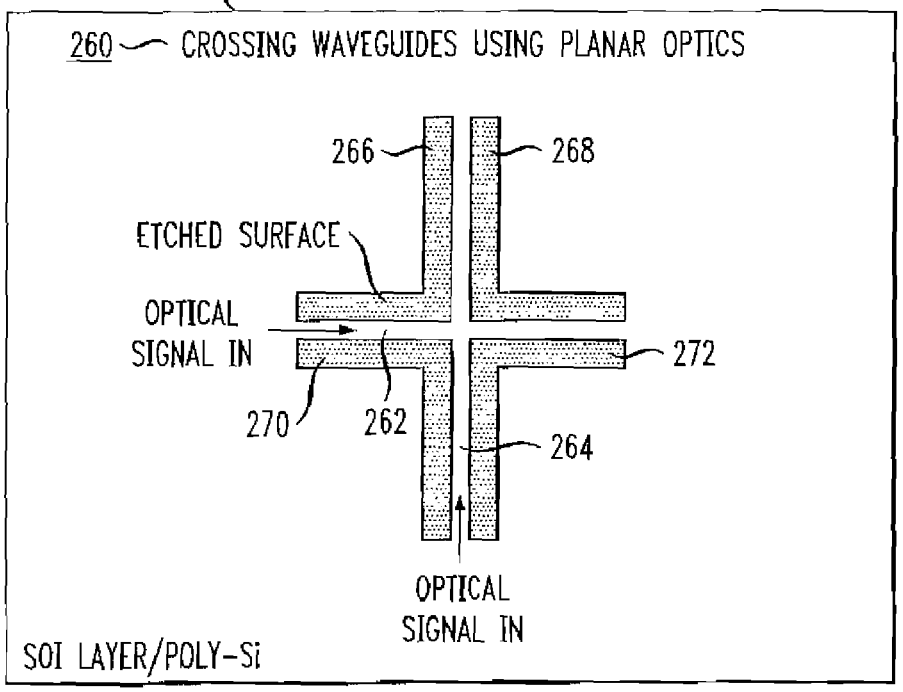
FIG. 16 is a top view of an exemplary arrangement of a pair of crossing waveguides formed within a sub-micron SOI layer in accordance with the present invention.
Figure 17:
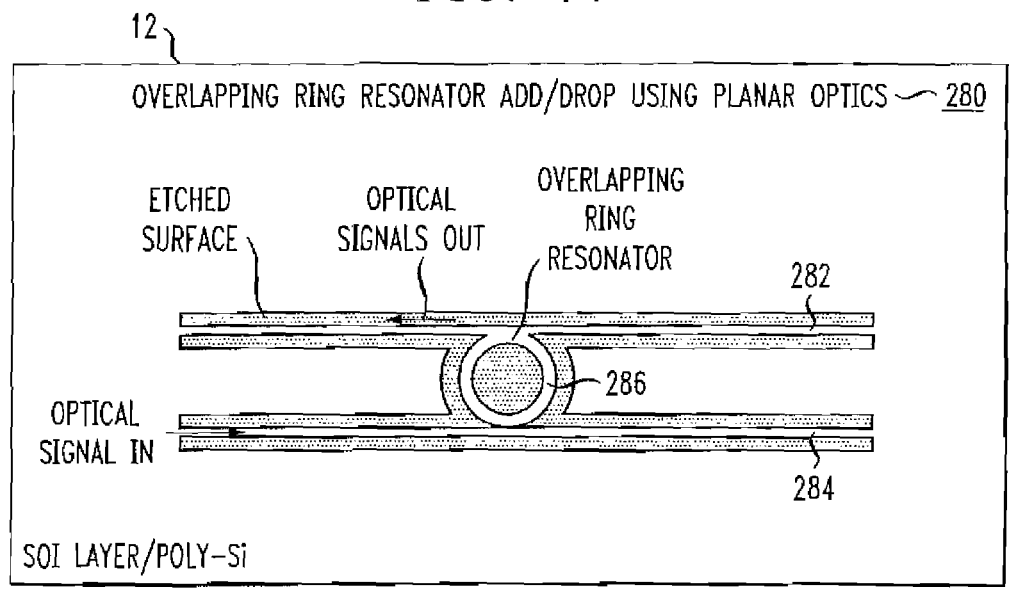
FIG. 17 is a top view of an exemplary overlapping ring resonator structure formed within a sub-micron SOI layer in accordance with the present invention.

FIG. 15 illustrates an exemplary optical switch 240 that may be formed within SOI layer 12 of SOI structure 10. A set of etched regions 242, 244 and 246 are formed as shown to define the outline of the 2×2 switch 240. An interior portion 248 of region 244 is properly sized so as to allow an optical signal propagating along a first waveguide 250 to be evanescently coupled into a second waveguide 252. A crossing waveguide arrangement 260 is illustrated in FIG. 16, where a first waveguide 262 and a second waveguide 264 are formed by etching a set of four right-angle regions 266, 268, 270 and 272, disposed as shown in FIG. 16. An overlapping ring resonator structure 280 is illustrated in FIG. 17, where SOI layer 12 is patterned and etched so as to form a pair of waveguides 282 and 284, with a ring structure 286 overlapping the pair of waveguides 282, 284.

Figure 18:
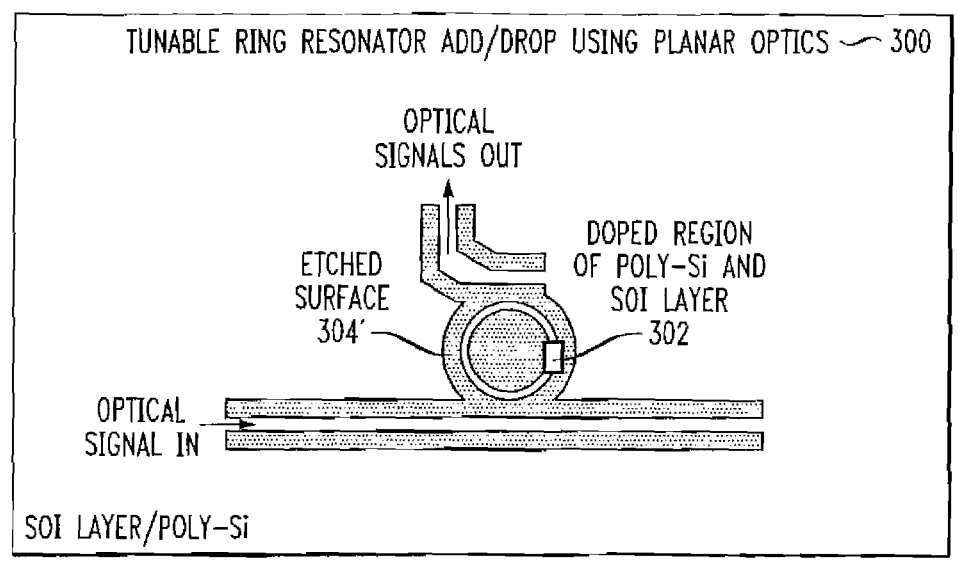
FIG. 18 is a top view of an exemplary active, tunable ring resonator structure formed within a sub-micron SOI layer in accordance with the present invention.

As mentioned above, it is to be remembered that any of the various devices described above, as well as any other type of planar optical device, can also be formed using SOI structure 20 as illustrated in FIG. 2, with an etching process used to remove optical silicon layer 22, dielectric layer 30 (when present) and SOI layer 24. Moreover, an important aspect of the present invention is the ability to selectively dope regions of various devices to form active structures, the doping providing the ability to be wavelength selective, for example, by "tuning" the optical device. FIG. 18 illustrates an exemplary tunable ring resonator 300, where region 302 of optical silicon layer 22 and SOI layer 24 is doped so as to modify the conductivity of the device. Therefore, by applying a control signal (not shown) to region 302, the particular wavelength is filtered out by ring resonator portion 304 of tunable device 300. In a similar manner, various ones of the devices described above may be selectively doped to provide wavelength sensitivity, where the process of masking and doping selection portions of an etched structure is well-known in the integrated circuit fabrication industry.

Moreover, it is an advantage of the present invention that the electrical components associated with the operation of the optical components may be formed simultaneously with the optical elements, using the same mask to define features of both the optical and electrical components, as disclosed in our commonly-assigned U.S. Pat. No. 6,968,110, filed Apr. 21, 2004 and issued on Nov. 22, 2005. Indeed, our commonly-assigned U.S. Pat. No. 6,980,720, filed Apr. 5, 2004 and issued on Dec. 27, 2005 discloses a particular process for integrating the layout of both optical and electrical components using a conventional Manhattan geometry layout tool. Some of the electrical components, for example, may be used to "tune" the performance of various active optical components, particularly in terms of wavelength sensitivity.

As mentioned above in association with FIG. 2, a sub-micron thick polysilicon layer 22 may be formed over a sub-micron SOI layer 24, and the composite structure then patterned and etched to form planar optical structures, in accordance with the present invention. In accordance with another aspect of the present invention, manipulation of light in planar waveguiding structures can be accomplished by modifying the effective mode index of the combination of SOI layer 24 and polysilicon layer 22. In particular, polysilicon layer 22 of SOI structure 20 can be patterned to form a planar optical device that will function to modify the effective mode index. The arrangement is then etched to remove most of polysilicon layer 22, leaving only a lens structure over dielectric layer 30. Advantageously, dielectric layer 30 is used as an "etch stop" so as to prevent SOI layer 22 from being removed during etching. Thus, when an optical signal propagating along SOI layer 24 encounters this lens, it will "see" a change in the effective mode index, allowing the signal to be focused by the lens.

Using the same etching technique, a variety of planar optical devices may be formed, as illustrated in FIG. 19. In particular, FIG. 21 contains a top view of SOI structure 20, where dielectric 30 is exposed to form the majority of the surface region. A polysilicon lens 312, as discussed above, is included in this set of exemplary "mode index changing" devices formed in accordance with the present invention. Also illustrated in FIG. 19 is a concave lens 314, a prism 316, a beam splitter 318, an in-line grating 320, an in-line diffracted grating 322 and a diffractive Fresnel lens 324. By controlling the pattern formed in the mask used to etch polysilicon layer 22, each of these structures may easily be formed, with the dimensions of each device dictated only by the resolution of the etch process. Additionally, and as discussed above, selected portions of these devices may be doped, when appropriate, to form active, tunable planar optical devices.

Lastly, it is possible to use a material other than polysilicon to form the mode index changing optical devices as illustrated in FIG. 19. For example, silicon dioxide, silicon nitride, or even a doped glass material (for example, a rare earth material such as erbium) may be used.

The present invention has been set forth with reference to certain particularly preferred embodiments thereof. Those of ordinary skill in the art will appreciate that the present invention need not be limited to these presently preferred embodiments and will understand that various modifications and extensions of these embodiments may be made within the scope of the subject matter of the present invention. Consequently, the present invention is not intended to be limited to any of the described embodiments, but is instead to be defined by the claims appended hereto.

What is claimed is:

1. An SOI-based optical arrangement for manipulating a propagating lightwave signal, the arrangement comprising
   a silicon substrate;
   a dielectric layer disposed over the silicon substrate;
   a single crystal silicon layer disposed over the dielectric layer;
   a sub-micron thick dielectric layer disposed over the single crystal silicon layer; and
   a sub-micron thick device silicon layer disposed over the sub-micron thick dielectric layer, where the combined thickness of the device silicon layer, the sub-micron thick dielectric layer and the single crystal silicon is less than one micron and the single crystal silicon layer is etched through in predetermined regions so as to expose the underlying dielectric layer, the refractive index difference between the remaining area of the single crystal silicon layer and the etched regions creating interfaces for manipulating the properties of the propagating lightwave signal.

2. An SOI-based optical arrangement as defined in claim 1 wherein the device silicon layer comprises a material selected from the group consisting of: polysilicon, amorphous silicon, grain-size enhanced polysilicon, grain-aligned polysilicon.

3. An SOI-based optical arrangement as defined in claim 1 wherein the single crystal silicon layer and the device silicon layer are doped to enable the formation of active optical devices.

4. An SOI-based optical arrangement as defined in claim 1 wherein the combination of the device silicon layer, the sub-micron thick dielectric layer and the single crystal silicon layer is etched through in predetermined areas so as to expose the underlying dielectric layer, the refractive index difference between the remaining regions and the etched regions creating interfaces for manipulating the properties of the propagating lightwave signal.

5. An SOI-based optical arrangement as defined in claim 1 wherein the combination of the single crystal silicon layer, the sub-micron thick dielectric layer and the device silicon layer is etched to create at least one etched region including at least one vertical sidewall, the interface between the at least one vertical sidewall and the combination of the remaining single crystal silicon layer, the remaining dielectric layer and the remaining device silicon layer creating a reflecting surface.

6. An SOI-based optical arrangement as defined in claim 5 wherein the vertical sidewall is disposed at a predetermined angle with respect to the propagating lightwave signal.

7. An SOI-based optical arrangement as defined in claim 6 wherein the vertical sidewall is disposed at an angle of 45° with respect to the propagation direction of the lightwave signal and forms a turning mirror.

8. An SOI-based optical arrangement as defined in claim 5 wherein the at least one vertical sidewall includes a vertical sidewall having a curved surface that intercepts the propagating lightwave signal.

9. An SOI-based optical arrangement as defined in claim 8 wherein the curved surface is a concave surface for focusing the propagating lightwave signal into a predetermined focal point.

10. An SOI-based optical arrangement as defined in claim 1 wherein the combination of the single crystal silicon layer, the sub-micron thick dielectric layer and the device silicon layer is etched to include a tapered transition region between a first etched waveguide of width $w_1$ and a second etched waveguide of width $w_2$.

11. An SOI-based optical arrangement as defined in claim 10 where $w_1 > w_2$ and the etched taper is defined as an input taper.

12. An SOI-based optical arrangement as defined in claim 10 wherein the etched taper provides an adiabatic transition between the first etched waveguide and the second etched waveguide.

13. An SOI-based optical arrangement as defined in claim 10 where $w_l < w_2$ and the etched taper is defined as an output taper.

14. An SOI-based optical arrangement as defined in claim 1 wherein the combination of the single crystal silicon layer, the sub-micron thick dielectric layer and the device silicon layer is etched to form a V-shaped etched region that is disposed with respect to the propagation of a lightwave signal such that the signal is reflected off of each side of the V and is split to follow a pair of signal paths propagating in opposing directions, the V-shaped etched region forming an optical beam splitter.

15. An SOI-based optical arrangement as defined in claim 1 wherein the single crystal silicon layer is etched to form a grating structure disposed to intercept a propagating lightwave signal.

16. An SOI-based optical arrangement as defined in claim 15 wherein the grating structure is linear.

17. An SOI-based optical arrangement as defined in claim 15 wherein the grating structure comprises a concave curvature.

18. An SOI-based optical arrangement as defined in claim 1 wherein the single crystal silicon layer is etched to form a waveguide pattern, the width of the waveguide remaining less than one micron.

19. An SOI-based optical arrangement as defined in claim 18 wherein at least one portion of the waveguide pattern includes a grating structure etched within the device silicon layer.

20. An SOI-based optical arrangement as defined in claim 18 wherein the waveguide pattern includes a waveguide coupler arrangement comprising
a first waveguide segment having an input portion, a coupling portion and an output portion; and
a second waveguide segment, disposed parallel to the first waveguide segment and having an input portion, a coupling portion and an output portion, wherein the first and second waveguide segments are configured such that the parallel coupling portions are close enough to one another to allow for the propagating lightwave signal to be coupled from a first one of the parallel coupling portions to a second one of the parallel coupling portions.

21. An SOI-based optical arrangement as defined in claim 18 wherein the waveguide pattern includes
a linear waveguide segment; and
at least one circular waveguide disposed adjacent to the linear waveguide such that a lightwave signal propagating along the linear waveguide is coupled into the at least one circular waveguide as a function of the wavelength of the propagating lightwave signal.

22. An SOI-based optical arrangement as defined in claim 21 wherein the at least one circular waveguide comprises a plurality of circular waveguides disposed in a spaced-apart relationship along the length of the linear waveguide segment.

23. An SOI-based optical arrangement as defined in claim 21 wherein the at least one circular waveguide comprises a plurality of circular waveguides arranged in a contiguous relationship and disposed in a direction normal to the linear waveguide segment.

24. An SOI-based optical arrangement as defined in claim 18 wherein the waveguide pattern comprises at least one multimode interferometer including
an input waveguide portion;
a mixing portion coupled to the input waveguide portion for generating an interference pattern within a propagating lightwave signal; and
a plurality of output waveguide portions coupled to the mixing portion and disposed to out-couple the plurality of interference signals generated within the mixing portion.

25. An SOI-based optical arrangement as defined in claim 24 wherein the at least one multimode interferometer comprises a plurality of cascaded multimode interferometers, where the plurality of output waveguide portions of a first stage are used as input waveguide portions of a plurality of multimode interferometers forming a second stage.

26. An SOI-based optical arrangement as defined in claim 18 wherein the waveguide pattern comprises at least one Mach-Zehnder interferometer including
an input waveguide portion;
an input Y-shaped portion coupled to the input waveguide portion for dividing the propagating lightwave signal into a pair of separate lightwave signals;
a first waveguide coupled to a first arm of the input Y-shaped portion;
a second waveguide coupled to a second arm of the input Y-shaped portion;
an output Y-shaped portion coupled, at the first and second arms, to the first waveguide termination and the second waveguide termination, respectively, for combining the pair of separate signals into an output lightwave signal; and
an output waveguide portion coupled to the output Y-shaped portion for receiving the output lightwave signal.

27. An SOI-based optical arrangement as defined in claim 26 wherein the Mach-Zehnder interferometer is a symmetric interferometer, coupling an essentially equal fraction of power into the first and second waveguides.

28. An SOI-based optical arrangement as defined in claim 26 wherein the Mach-Zehnder interferometer is an asymmetric interferometer, coupling an unequal fraction of power into the first and second waveguides.

29. An SOI-based optical arrangement as defined in claim 1 wherein the device silicon layer is etched to form at least one planar, two-dimensional optical device for modifying the optical behavior of the lightwave signal propagating through the underlying single crystal silicon layer.

30. An SOI-based optical arrangement as defined in claim 29 wherein the at least one planar, two-dimensional optical device comprises a lens.

31. An SOI-based optical arrangement as defined in claim 30 wherein the at least one lens is a convex lens.

32. An SOI-based optical arrangement as defined in claim 30 wherein the at least one lens is a concave lens.

33. An SOI-based optical arrangement as defined in claim 29 wherein the at least one planar, two-dimensional optical device comprises a prism.

34. An SOI-based optical arrangement as defined in claim 29 wherein the at least one planar, two-dimensional optical device comprises a grating.

35. An SOI-based optical arrangement as defined in claim 34 wherein the grating is disposed essentially perpendicular to the propagation direction of the lightwave signal.

36. An SOI-based optical arrangement as defined in claim 34 wherein the grating is a chirped grating.

37. An SOI-based optical arrangement as defined in claim 34 wherein the grating is disposed at a predetermined angle with respect to the propagation direction of the lightwave signal.

38. An SOI-based optical arrangement as defined in claim 29 wherein the at least one planar, two-dimensional optical device comprises a beam splitter.

39. An SOI-based optical arrangement as defined in claim 29 wherein the at least one planar, two-dimensional optical device comprises a diffractive optical device.

40. An SOI-based optical arrangement as defined in claim 39 wherein the diffractive optical device comprises a Fresnel lens.

41. An SOI-based optical arrangement as defined in claim 1 wherein the device silicon layer comprises a device polysilicon layer.

42. An SOI-based optical arrangement as defined in claim 1 wherein the device silicon layer comprises a device silicon nitride layer.

43. An SOI-based optical arrangement as defined in claim 1 wherein the device silicon layer comprises silica.

44. An SOI-based optical arrangement as defined in claim 43 wherein the silica comprises a rare-earth dopant for amplifying the propagating lightwave signal.

45. An SOI-based optical arrangement as defined in claim 44 wherein the rare-earth dopant comprises erbium.

* * * * *